Sept. 21, 1965   R. L. JONES   3,207,436
THERMOSTATIC VALVE
Filed Jan. 7, 1963

INVENTOR.
RAYMOND L. JONES
BY
Frank J. Foley

United States Patent Office 3,207,436
Patented Sept. 21, 1965

3,207,436
THERMOSTATIC VALVE
Raymond L. Jones, 1187 Cedar St., Elgin, Ill.
Filed Jan. 7, 1963, Ser. No. 249,898
6 Claims. (Cl. 236—34)

This invention relates to improvements in thermostatically operated valves which are not responsive to pressure changes, such valves being particularly adapted for use in cooling systems of internal combustion engines.

This invention employs a wax-fusion type of thermally responsive means for opening the valve. As rising temperatures in the coolant cause the wax to melt and expand, the expanding wax compresses a rubber diaphragm or body, which reacts against a stationary pin partially embedded in the rubber, and since the wax and the rubber diaphragm are carried in the valve head, the valve perforce must and does recede from the pin, thus causing the valve to unseat in proportion to the amount of wax which has melted.

It is desirable that the pin be capable of longitudinal adjustment in order to vary the initial opening response of the valve and the extent of its opening responsive to certain temperature variations. Such reaction pins, usually threaded adjacent to their exposed ends, have been used heretofore, but vibration of the valve heads has in many instances caused damage to such threaded pins and thus shortened the lives and reduced the dependability of such valves.

It is an object of this invention to provide a valve of the above described type, employing an adjustable reaction pin, but having a rugged design which will reduce vibration to such a level that the life and durability of the valve is not impaired.

It is another object of this invention to provide a thermostatically operated valve which is firmly guided during opening and closing movements and while open so as to prevent lateral vibration of the valve.

Another object of the invention is to provide in the aforesaid type of valve a threaded adjustable reaction pin and means for mounting a valve head relatively to the pin in such manner that turbulent flow of water past the valve head cannot transmit vibration to the pin in such amount as might cause damage to the threads of the pin.

Another object of the invention is to provide a valve structure in which tilting or misalignment of the valve head when seating may be prevented.

The drawing shows a preferred embodiment of this invention, but it should be understood that some variations from this embodiment may be employed without departing from the principle of the invention.

In the drawing, FIGURE 1, is a vertical central sectional view on the line 1—1 of FIGURE 2.

Figure 2:
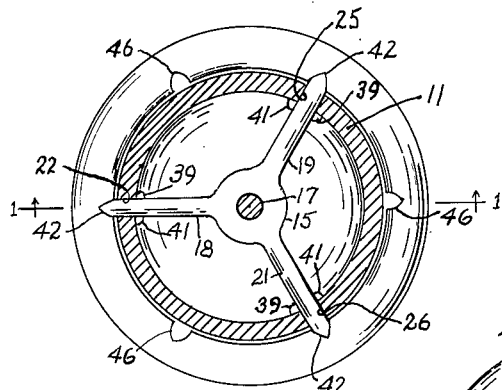
FIGURE 2 is a horizontal sectional view on the line 2—2 of FIGURE 1.
Figure 3:
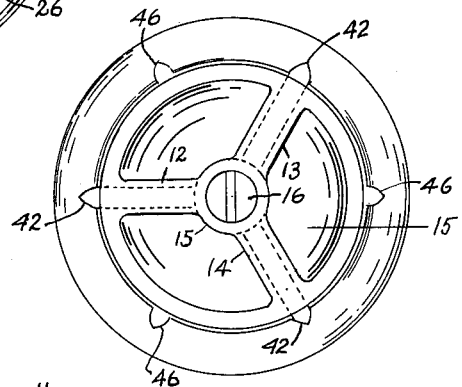
FIGURE 3 is a top plan view of the valve.

In the drawing, the valve casing is formed in the shape of a nozzle, generally indicated as 11, the upper end of which is spanned by three fingers 12, 13 and 14 radiating from a central hub 15 which has a central threaded bore with which the threads 16 of the reaction pin 17 are engaged.

Figure 1:
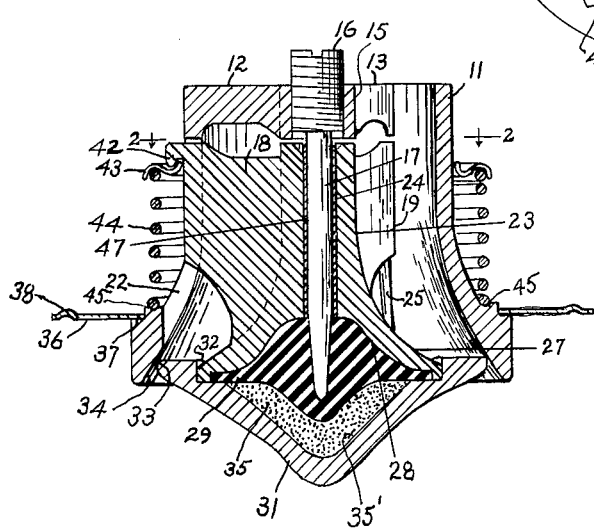

The side wall of nozzle 11 is pierced by three vertical slots through which the valve guide vanes 18, 19 and 21 extended. One of these slots 22 is shown in FIGURE 1.

The valve itself is an assembly of a central valve body or core 23 having a vertical central bore 24 through which the reaction pin extends. From this central core the three guide vanes 18, 19 and 21 extend radially through slots 22, 25 and 26. The lower portion of the valve core is flared radially as at 27 and has a recess 28 forming the ceiling for a chamber in which is disposed a solid piece of rubber 29. Below this chamber and circumscribing the flared skirt 27 is a cap 31 which may be locked in sealed relation with the skirt 27 by any suitable means such as welding, brazing, or displacement of metal from the cap 31 at 32, or otherwise. The perimeter of the cap at 33 serves as a valve head which makes contact, when the valve is closed, with the flared bottom portion 34 of the nozzle 11. As shown in FIGURE 1, a space is provided within the hollow cap 31, below the rubber body 29, for a body 35 of a wax composition, which should have a melting point at about the temperature range at which it is desired that the valve shall open.

In order that this valve may be seated and properly sealed upon an engine block in a conventional manner, a sheet metal annular ring 36 is tightly secured to the annular shoulder 37 of the nozzle in any suitable manner. A bead 38 may be provided on the ring 36 which may be clamped down in sealed relation with the engine block according to conventional practice, with the valve seat and valve extending into the coolant in the block.

Each of the vanes 18, 19 and 21 are provided with vertically extending shoulders such as 39 and 41 which will bear against the inner margins of the slots through which these vanes extend. The fit of the vanes should be rather snug in these slots, but not so tight as to cause undue friction.

The outer extremities of the vanes, as indicated in FIGURE 1, each have a hook-shaped portion 42 which engages the top of the spring pilot ring 43, against the underside of which a spiral spring 44 bears under considerable compression. The lower end of this spring is seated in the circular groove 45. This spring serves to seat the valve cap 31 against the nozzle skirt 34 whenever the wax cools sufficiently to permit such seating.

The threaded reaction pin 17 may be manually advanced into or retracted in carefully controlled amounts to vary its compression of the rubber diaphragm 29. Hence, when this valve is being manufactured, it may readily be calibrated to open and to close responsive to narrowly selected temperatures. Broadly of course, this is not novel, but the design and construction of this valve is such that the pin may be used later, after prolonged use of the valve, to make further adjustment. Because of the coaction between the radial vanes, which move bodily with the valve head, and the vertical slots, this valve head cannot vibrate laterally and cause the pin 17 to be rocked in its threaded connection with hub 15 and be damaged or get out of adjustment.

The vertical slots 22, 25 and 26 are so formed and proportioned that the valve head assembly, with its vanes attached or formed integrally therewith, may be inserted upwardly through the valve seat. In order to pass the spring pilot ring 43 down over the protruding hooks 42 of the vanes to engage the spring 44, slots such as 46 may be cut in the inner margin of the ring to permit such passage, after which partial rotation of the ring will enable it to hold the spring in operative position.

In connection with the function of the vanes in securing the valve head against rocking when it is subject to the violent turbulence of the flowing water, it will be noted that the spring 44 is kept out of the path of the flowing stream of water. The nozzle provides a smooth streamlined pathway for the water. The shape of the valve head itself also contributes to smooth water flow.

The shape and size of that portion of the valve head which is exposed to the water below the valve seat on the nozzle skirt 34 causes the wax chamber to be more quickly and delicately responsive to changes in the water temperature. In very cold weather such sharp response of the valve to temperature changes will enable this valve to meter or regulate the water flow to the radiator with a high degree of accuracy and responsiveness.

While the reaction pin may be threaded toward or away from the wax chamber for calibrating the valve, it is of course possible also to vary the shape of the wax chamber by denting it inwardly, as has commonly been done heretofore with valves of wax-fusion type.

Any suitable means may be employed, if desired, for locking the reaction pin 17 after the valve has been calibrated to open at a selected temperature. For example, a conventional nut and lock washer may be applied to the exposed threaded end of the pin, or the metal of the hub 15 adjacent the threads may be upset in a conventional manner to jam the threads.

Instead of providing three vertical slots in the nozzle 11 and three radial vanes engaged with them, I may employ four or more equally spaced slots and an equal number of vanes engaged with them. The shoulders 39 and 41 may be employed or not, as desired.

In the drawing the vanes such as 18 are shown, for the sake of clarity, as engaging less than the entire vertical extent of the associated slots. However, these vanes may be shaped and extended to engage the entire vertical extent of the slots, each vane terminating just above the cap 31.

In addition to the functions of stabilizing the valve head against lateral displacement and coacting with the valve return spring 44 located on the outside of the nozzle 11, the vanes also serve to channel the water flowing through the nozzle past the valve to reduce turbulence.

Since the nozzle slots and vanes are perpendicular to the plane of the valve sheet, whenever the valve is closing it must always come to rest squarely and fully on the valve seat.

The vanes and nozzle slots amply guide the vertical movement of the entire valve body, hence it is unnecessary to rely on the reaction pin as a guide by having it fit snugly in the valve body, as has been a common practice heretofore in valves of this character. Trouble-free movement of the vanes is assured by the fact that their frequent vertical reciprocation will always keep the slots clean.

If desired, the space in the central bore 24 of the valve body surrounding the pin may be filled by a sleeve 47 of "Teflon," rubber, or other material having little frictional drag on either the pin 17 or the bore 24, according to whether or not the sleeve moves with the pin. Such a sleeve will also exclude sediment.

Any suitable and conventional means for preventing rotation of the ring 43 relatively to the vanes during use may be provided, for example, dents or recesses or projections in or on the ring to receive or to engage the tips of the vanes.

In place of the spring 44 as shown, I may use a spring of somewhat conical instead of cylindrical shape, the upper end of which will be small enough to underlie the tips 42 of the vanes directly, thus eliminating any need for the ring 43. The upper end of such a spring can be expanded during assembly to slip down over the vane tips.

It should be understood that the invention is subject to some modification and variation without departing from the principles and scope of the invention as it is defined in the appended claims.

Having shown and described my invention, I claim:

1. In a thermostatic valve for controlling coolant flow in an internal combustion engine block, a generally cylindrical vertical nozzle, means for positioning the nozzle on the block with its lower end exposed to the coolant within the block, the lower end of the nozzle providing a valve seat, a valve disposed centrally of the nozzle having a slender upper central core portion and an enlarged hollow lower disk-like lower portion constituting a valve head registrable with said valve seat, the upper portion of the nozzle having a plurality of circumferentially spaced apart narrow vertical slots, a plurality of thin vertical vanes extending radially from said core portion engaged with said slots, a spiral spring surrrounding and seated on the outside of said nozzle, means on said vanes engaging and compressing said spring for resiliently seating said valve upwardly, the valve head providing an enclosed chamber containing a thermally expansive wax body of greater horizontal than vertical dimension, a rubber diaphragm disposed in sealing relation on top of said body, a reaction pin slidably extending vertically through said core portion having its lower end engaged with said diaphragm, and means supporting the upper end of the pin on said nozzle.

2. In a thermostatic valve for controlling coolant flow in an internal combustion engine block, a generally cylindrical vertical nozzle, means for positioning the nozzle on the engine block with its lower end exposed to the coolant within the block, the lower end of the nozzle providing a valve seat, a valve disposed centrally of the nozzle having a slender upper central core portion and an enlarged hollow lower disk-like lower portion constituting a valve head registrable with said valve seat, the upper portion of the nozzle having a plurality of circumferentially spaced apart narrow vertical slots, a plurality of thin vertical vanes extending radially from said core portion through said slots, a spiral spring surrounding and seated on said nozzle, means including projections on said vanes engaging the spring outside the nozzle and coacting with the spring for seating the spring upwardly, the valve head providing an enclosed chamber containing a thermally expansive wax body of greater horizontal than vertical dimension, a rubber diaphragm disposed in sealing relation on top of said body, a reaction pin slidably extending vertically through said core portion having its lower end engaged with said diaphragm, and means supporting the upper end of the pin on said nozzle.

3. In a thermostatic valve for controlling coolant flow in an internal combustion engine block, a vertical nozzle, means intermediate the upper and lower ends of the nozzle for positioning the nozzle on an engine block with its lower end extending into the coolant in the block, the inside and outside diameters of the nozzle portion above said means being substantially less than those of the nozzle portion below said means, the latter nozzle portion providing a circular valve seat near its lower end, a valve disposed centrally of the nozzle having a slender upper central core portion and an enlarged hollow lower disk-like lower portion constituting a valve head registrable with said valve seat, the upper portion of the nozzle having a plurality of circumferentially spaced apart narrow vertical slots, a plurality of thin vertical vanes extending radially from said core portion and engaged with said slots, a spiral spring surrounding and seated on the outside of said nozzle, means operatively connecting the spring and vanes for resiliently seating said valve upwardly, the valve head providing an enclosed chamber containing a thermally expansive wafer of fusible material having a greater horizontal than vertical dimension, a rubber diaphragm disposed in sealing relation on top of said wafer, a reaction pin slidably mounted vertically in and through said core portion having its lower end engaged with said diaphrgam, and means supporting the upper end of the pin on said nozzle.

4. In a thermostatic valve for controlling coolant flow in an internal combustion engine block, a generally cylindrical vertical nozzle, means for positioning the nozzle on the engine block with its lower end exposed to the coolant within the block, the lower end portion of the nozzle providing a valve seat, a valve disposed centrally of the nozzle having a slender upper central core portion and an enlarged hollow lower disk-like portion constituting a valve head registrable with said valve seat, the upper portion of the nozzle having a plurailty of circumferentially spaced apart narrow vertical slots, a plurality of thin vertical vanes affixed to and extending radially from said core portion and slidably engaged with said slots, a spiral spring surrounding and seated on the outside of the nozzle above said means, means operatively connecting the spring and vanes for resiliently seating said valve upwardly, the lower portion of the valve consisting of a radially flared downwardly extending skirt on the lower end of said core portion and a bottom cap closure sealed to said skirt and defining with the skirt an enclosed chamber having a greater horizontal than vertical dimension, a thermally expansive wafer of fusible material in said chamber, a rubber diaphragm overlying the wafer and sealing it against the cap, a reaction pin mounted for slidable movement in and extending through said core portion having its lower end engaged with said diaphragm, and means supporting the upper end of the pin on said nozzle.

5. In a thermostatic valve for controlling coolant flow in an internal combustion engine block, a generally cylindrical vertical nozzle, means for positioning the nozzle on the engine block with its lower end exposed to the coolant within the block, the lower end portion of the nozzle providing a valve seat, a valve disposed centrally of the nozzle having a slender upper central core portion and a hollow lower disk-like portion constituting a valve head registrable with said valve seat, the upper portion of the nozzle having a plurality of circumferentially spaced apart narrow vertical slots, a plurality of thin vertical vanes affixed to and extending radially from said core portion and slidably engaged with said slots, said vanes and slots restraining the valve from lateral displacemnt during movement and seating, said vanes dividing the nozzle interior into separate vertical coolant flow channels, a spiral spring surrounding and seated on the outside of the nozzle above said means, means operatively connecting the spring and valve for resiliently seating the valve upwardly, the valve head providing an enclosed chamber containing a thermally expansive wafer of fusible material having a greater horizontal than vertical dimension, a rubber diaphragm disposed in sealing relation on top of said wafer, a reaction pin mounted vertically and extending through said core portion and having its lower end engaged with said diaphram, and means supporting the upper end of the pin on said nozzle.

6. In a thermostatic valve for controlling the flow of a heated liquid through an aperture in a wall, a generally cylindrical vertical nozzle, means for positioning the nozzle in such aperture with one end portion of the nozzle exposed to the liquid on one side of the wall, said end of the nozzle providing a valve seat, a valve disposed centrally of the nozzle having a central elongated core portion and integral therewith a disk-like end portion constituting a valve head registrable with said valve seat, the other end portion of the nozzle having a plurality of circumferentially spaced apart narrow slots extending lengthwise of the nozzle, a plurality of thin vanes extending radially from said core through portion said slots, a spiral spring outside the nozzle surrounding the nozzle and seated thereon, means including projections on said vanes engaging the spring outside the nozzle and coacting with the spring for seating the valve head, the valve head providing an enclosed chamber containing a thermally expansive wax body of greater dimension perpendicular to the axis of the nozzle than parallel thereto, a rubber diaphragm disposed in sealing relation to one face of said wax body, a reaction pin extending slidably through the axis of said core portion and having its free end engaged with said diaphragm, and means securing the opposite end of the pin on the nozzle.

References Cited by the Examiner
UNITED STATES PATENTS

| | | | |
|---|---|---|---|
| 2,584,877 | 2/52 | Hoffman et al. | 236—34.5 |
| 2,829,834 | 4/58 | Drapeau et al. | 236—34 |
| 2,981,477 | 4/61 | Salmon | 236—34 |
| 3,075,703 | 1/63 | Freismuth | 236—34 |

EDWARD J. MICHAEL, *Primary Examiner.*